United States Patent
Sahs

[11] Patent Number: 5,861,557
[45] Date of Patent: Jan. 19, 1999

[54] CABLE YIELD INDICATOR FOR EARTHQUAKE RESTRAINER CABLES

[76] Inventor: Stephen Sahs, 2821 Tioga Way, Sacramento, Calif. 95821

[21] Appl. No.: 966,348

[22] Filed: Nov. 7, 1997

[51] Int. Cl.$^6$ ...................................................... G01L 5/06
[52] U.S. Cl. ........................... 73/761; 411/11; 411/186; 411/544
[58] Field of Search ............................. 73/760, 761, 774, 73/786, 862.391, 862.621, 862.636, 862.637, 862.471; 411/154–156, 8–14, 160–165, 186–189, 544

[56] References Cited

U.S. PATENT DOCUMENTS

| | | | |
|---|---|---|---|
| 2,476,561 | 7/1949 | Pedersen | 73/761 |
| 3,469,492 | 9/1969 | Dahl | 73/761 |
| 3,812,758 | 5/1974 | Bossler, Jr. | 73/761 |
| 3,948,141 | 4/1976 | Shinjo | 73/761 |
| 4,170,163 | 10/1979 | Payne | 73/761 |
| 4,498,825 | 2/1985 | Pamer et al. | 73/761 |
| 4,506,555 | 3/1985 | McCubbin | 73/862.471 |

*Primary Examiner*—Ronald Biegel
*Attorney, Agent, or Firm*—Mark C. Jacobs, Esq.

[57] ABSTRACT

An annularly configured device for use on each earthquake restrainer cable of a bridge, which device, will deform due to its internal configuration upon the occurrence of an earthquake, if the earthquake stresses the bridge cable with which the device is associated excessively. The result of the stress is a visual indication of the cable's elongation as manifested by a "crowning" of the annular indicator and a shortening of its length. The specific configuration required of the annular member is one of a reduced thickness section of the interior wall, with tapered edges leading to the main cross section of the annular member.

6 Claims, 2 Drawing Sheets

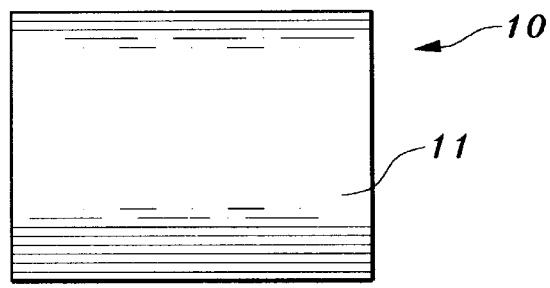
Fig. 1
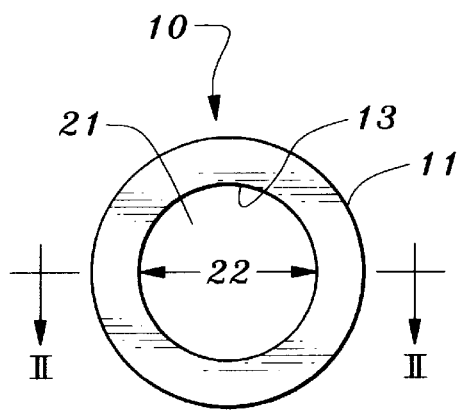
Fig. 2
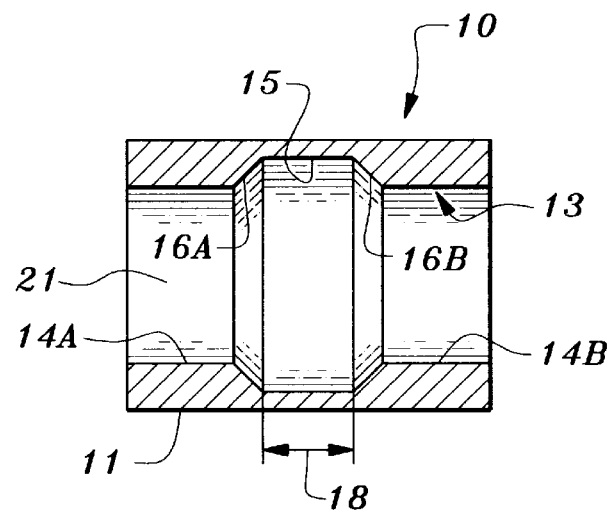
Fig. 3
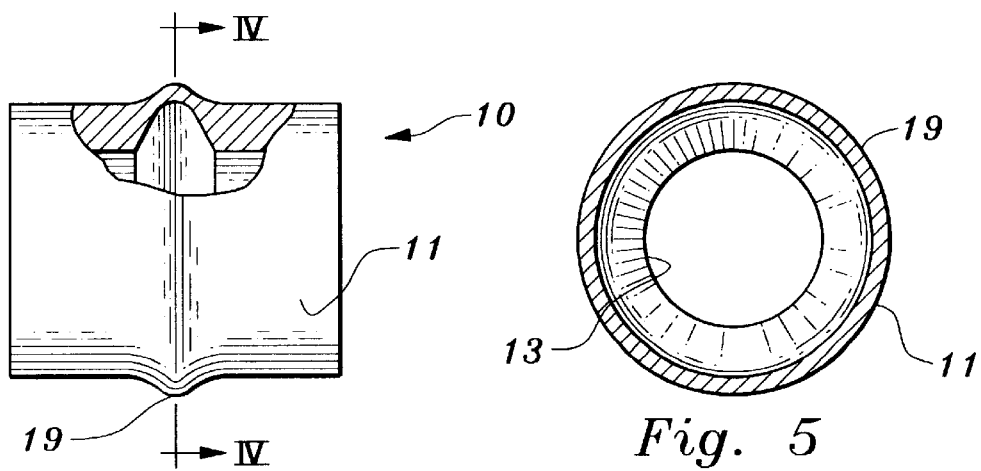
Fig. 4
Fig. 5

CABLE YIELD INDICATOR FOR EARTHQUAKE RESTRAINER CABLES

FIELD OF THE INVENTION

The invention pertains to a deformable hardware element that is attached to each earthquake restrainer cable used on a bridge to indicate when the cable has been elongated due to movement of the bridge caused by a seismic event. The element permanently deforms if the cable has received a force large enough to yield the cable and causing the cable to elongate.

BACKGROUND OF THE INVENTION

In civil engineering terminology, a bridge is a structural unit or a series of structural units called spans which are designed primarily for the purpose of supporting moving loads in addition to the bridge's own weight. These structures are generally known to, provide means for foot, highway, rail or even horse traffic to pass from one location to another over water, ground depressions, railroad tracks and other obstacles which may impede traffic flow. The instant invention is utilized on non-movable spans. A non-movable span is a bridge which while moving, does not have the total span move such as a vertical lift bridge, a swing bridge which may rotate 90 degrees, or a bascule bridge which pivots about a horizontal access or rolls back on circular segments.

Bridges that are relatively long, and which cannot be made in a single span to stretch from one column or bent on one side of the obstacle, be it a river, a set of tracks, a road, etcetera to reach the other side of the obstacle, are constructed in a plurality of spans connected together these bridges are called multi-span structures. The type of material used for construction dictates the maximum length of a span between two bents. Because materials move by thermal expansion and contraction, joints must be incorporated into the design or the bridge will tear itself apart. The joints are in two main forms, over bent joint and a fully supported hinge.

One type of bridge construction is known as a box beam system, wherein a box beam will stretch from a first side of the span and from the second side of the span but the distance between is not covered by a single column, but rather by a junction of a plurality of columns. This type of bridge construction is known as hinge bridge construction and the hinge between the two portions is shaped like a pair of elements, one of which is shaped like a FIG. 7 the other of which is shaped like an L both of which rest against each other. This combined element is called the bridge hinge. This quadrilateral shaped element is known in the art as a Wichert truss.

A series of cables are used to hold the vertical and horizontal portions of the hinge together. In the case of earthquake, these cables will elongate and absorb the energy that may cause the bridge to fail. Prior to the Northridge, Calif. earthquake and for several years subsequent thereto, the cables from the hinge were replaced on a guesstimate basis as to whether or not they had in fact elongated due to the longitudinal stresses that may have been placed upon them. Once a cable has been stressed to cause it to elongate, the cable becomes strain hardened and is no longer usable for its intended purpose. It was found that there was indeed a need for a cable yield indicator to advise a bridge inspector when and as one or more of the cables of a hinge bridge had extended.

It is an object therefore of this invention to provide an indicator means that gives a positive indication as to when an earthquake restrainer cable of a hinge bridge has elongated.

It is another object of this invention to provide a positive means of detecting cable elongation due to earthquake forces.

It is yet another object to provide a low cost device that is light in weight and which will give a visual indication of the previous existence of a stressed condition in an earthquake restrainer cable.

It is a still further object to provide an easy to install device that will advise a bridge inspector that a restrainer cable has elongated due to earthquake forces.

It is an additional object to provide a device that provides a visual indication that a bridge's earthquake restrainer cable has elongated due to the stress suffered by the cable.

Other objects of the invention will in part be obvious and will in part appear hereinafter.

The invention accordingly comprises the device possessing the features properties and the relation of components which are exemplified in the following detailed disclosure and the scope of the application of which will be indicated in the appended claims.

For a fuller understanding of the nature and objects of the invention reference should be made to the following detailed description, taken in conjunction with the accompanying drawings.

BRIEF DESCRIPTION OF THE FIGURES

FIG. 1 is an elevational view of the cable yield indicator of this invention.

FIG. 2 is an end view thereof.

FIG. 3 is a sectional view taken along line II—II of FIG. 2.

FIG. 4 is an elevational view, partially sectional, of the device of this invention after cables associated therewith have received a force large enough to cause them to elongate.

FIG. 5 is an end view taken along line IV—IV of FIG. 4.

SUMMARY OF THE INVENTION

Figure 6:
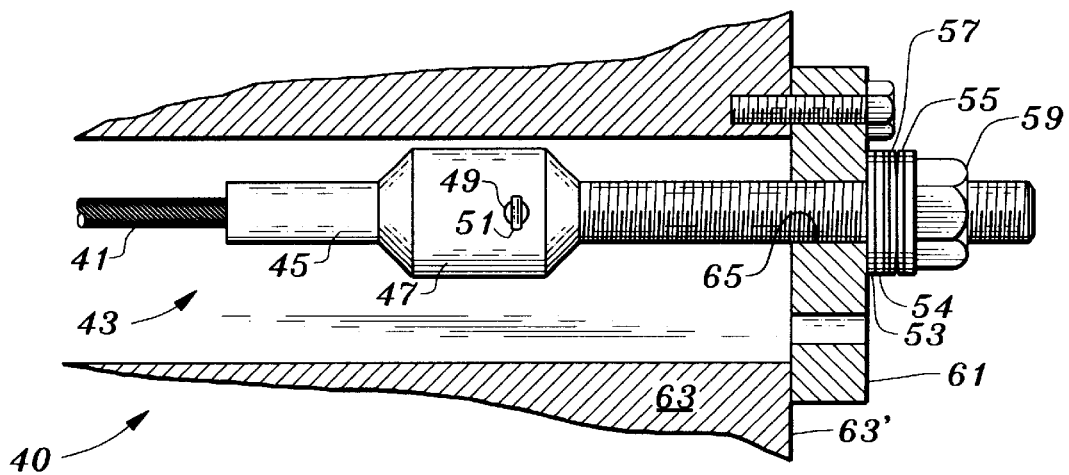
FIG. 6 is a diagrammatic side view of the prior art cable end anchorage system.

An annular configured device for use on each earthquake restrainer cable of a bridge, which device, will deform due to its internal configuration upon the occurrence of an earthquake, if the earthquake excessively stresses the bridge cable with which the device is associated. The result of the excessive longitudinal force is a visual indication of the cable's elongation as manifested by the "crowning" of the annular member.

DESCRIPTION OF THE PREFERRED EMBODIMENT

The discussion first turns to FIGS. 1 and 2, wherein the yield indicator of this invention, 10, is seen. The device is seen to be an elongated generally annular shaped unit having an outside surface 11 and an inside surface 13, and an interior diameter 22. The through opening herein is designated 21. As configured for ¾ inch cable, device 10 is about 2 inches long by about 1.5 inches in O.D., with an interior opening diameter or I.D. 0.75 inches. For cables, larger or smaller in diameter, the relative dimensions would be adjusted upwardly or downwardly as is appropriate.

In FIG. 3, a sectional view, the inside surface 13 of this annular member's wall configuration is seen. The interior surface has two full thickness mirror image thicknesses or zones, 14A, 14B, each of which commences at the opposite edge of the device and each is interiorly connected to one end of an inwardly directed angular zone, 16A and 16B respectively. The inwardly directed zones 16A and 16B each terminate at opposite ends of a central reduced uniform thickness zone, 18. The reduced thickness of the wall is shown as designator 15.

It is in this manner that the device 10 is disposed such that after the stresses of an earthquake have elongated the bridge's earthquake retainer cables, the device 10 will deform to assume the configuration shown in FIGS. 4 and 5. The discussion now moves to those figures. Whereas prior to the stress on the cable the device 10 was about 2 inches in length, after it has been deformed and assumed the configuration shown in FIG. 4, the overall length is reduced to about 1 and 13/16 ths inch. The crown or deformed outward section 19 seen in both FIGS. 4 and 5 is a compressed zone and is elevated about 1/8 th inch. This deformed state is NOT reversible.

DISPOSITION AND USE

Figure 7:
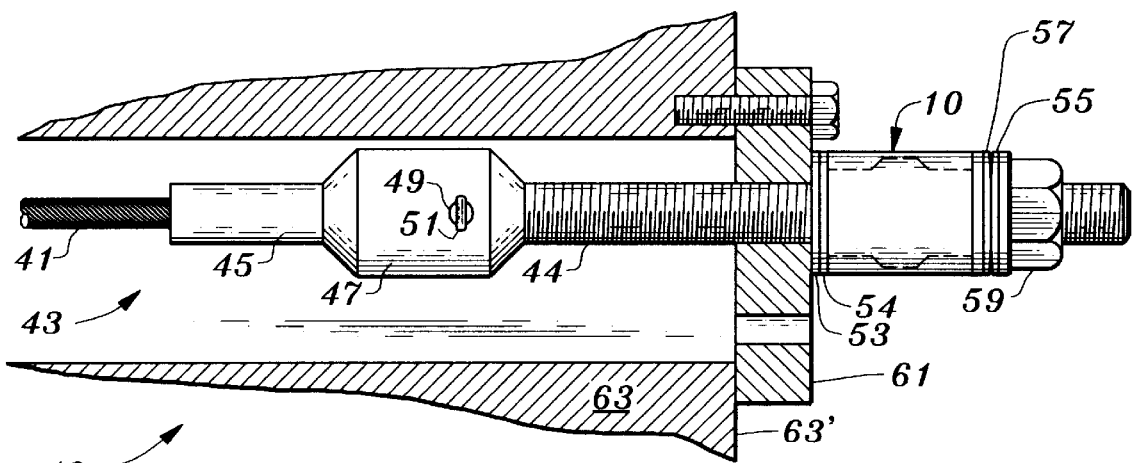
FIG. 7 is a diagrammatic side view of the cable end anchorage system which utilizes this invention.

The reader is now referred to FIGS. 6 and 7 which contrast the cable setup when this invention is employed and the prior art method of doing so respectively. In FIG. 6, one individual cable of the plurality of cables located at the hinge area of the span of a bridge is shown in part with its mounting arrangement, designated a cable end anchorage, 40. Thus cable 41, is shown disposed in a swaged fitting 43, has a narrower diameter cable receiving end, 45 and a wider diameter stud receiving end 47.

Reference is now made to FIG. 7, wherein for purposes of illustration only, the device of this invention, 10, is shown in section, but the other elements in this figure are not. Here the cable end anchorage 40 which employs this invention is seen.

The cable 41, is a conventional 3/4 inch 7 stranded subcable readily available in the marketplace. The swaged fitting 43 is known in the art to constitute a friction fit holder that is heated and crimped with a special plier-like tool, after the item it is to receive, is inserted, -here the cable 41. A crossbore 49 found in the narrower end 47 is filled with a cotter pin or other pin 51. The pin 51 is inserted through an unseen securing hole in the threaded stud.

Stud 44, which is a threaded shaft, threadedly engages the unseen threads of the narrower end 47 of the swaged fitting 43. In this view both the bolster 63 and the bearing plate 61 are conventional components utilized in bridge construction. The bearing plate 61, abuts the bolster at a 90 degree angle as shown at the bolster edge 63'. An opening 65 in the bearing plate aligned with the swaged fitting 43, permits the stud to pass through unengaged, such that a portion of the stud is on each side of the bearing plate.

Figure 8:
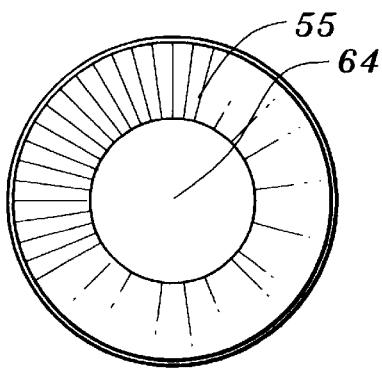
FIG. 8 is a top plan view of the disk springs utilized in the cable end anchorage system of this application.

Disposed on the side of the bearing plate distant from the swaged fitting 43 is at least one and preferably a pair of ordinary preferably steel spherical washers,53. Disposed on the shaft after the aforementioned washers are a pair of opposed disk springs, 55 and 57. One of these is seen in plan view in FIG. 8 wherein it appears to resemble any common washer with a center opening here labeled 64.

Figure 9:
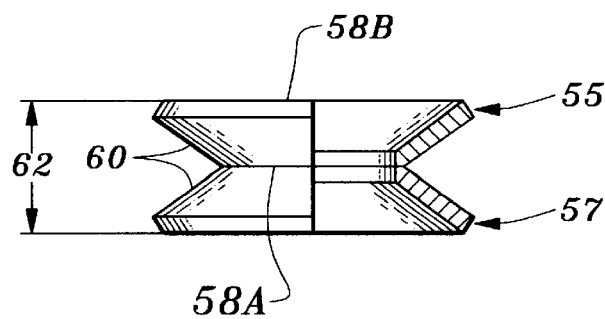
FIG. 9 is an elevational view of 2 disk springs disposed in the position in which they are utilized with this invention.

But when the opposed disk washers are shown in an edge view as in FIG. 9, the parallelogram cross-section of these disk washers is recognized. Thus upon reference to this figure it is seen that the two opposed disk springs 55, 57 have a slightly smaller in length upper base 58A and a larger base parallel thereto 58B, and each spring has a sidewall 60 that diverges angularly outwardly from the upper base to the lower base. From a practical point of view the sidewall 60 is only about 1/8 th inch thick.

The disk gap, a commonly understood term, 62 is the distance between the two larger bases of the respective disk washers. Upon compression, this gap is diminished. Compression transpires when the hex nut 59, is threadedly applied to the stud, tightened and then backed off slightly. Thus the need for an extra long stud. The gap diminution that takes place when the earthquake hits and stresses the cable is significantly higher than the mere nut tightening.

As is seen in FIG. 6, wherein the prior art cable hookup is shown diagrammatically without the presence of this invention it is seen that all of the components just discussed are present in the prior art, except for the cable yield indicator. Suffice it to say that the spring disks are chosen according to their rated value. For example, disks rated at 3500 lbs of force are needed to straighten and pretension a 3/4 inch diameter 40 foot cable.

In the prior art drawing of FIG. 6, no indicator is shown. In FIG. 7, once the nut is applied and tensed, it is backed off to a distance that is unique to each bridge span, and determinable by one of ordinary skill. This slack or slop allows the bridge to move slightly as is required. When this slack is created, the cable sags a bit as is desired.

It must be remembered that at the end of the cable not seen, a similar swage and nut are used to hold the cable in place. The distal end is fixed, and without the invention of this application, but the proximal end is not fixed as the hex nut can be tightened as needed to put more compression on the disk washers.

As has been stated, one cable does not a bridge make. Thus there are a plurality of cables, anywhere often, from 5 to 9 per bay and 2 to 4 bays per hinge. It is important that all of these be treated equally and that the same amount of compression be placed on all cable. Thus it is sometimes necessary to tweak the tension on any one cable by nut adjustment. This is all known to the art. Release of tension causes that individual cable to sag a bit more, tightening, reduces sag, since the distant end of the cable is locked into position.

After proper cable installation, an inspector will know that all cables are equally tensioned and that no problem has occurred from an inspection of the adjacent cables. The gaps will show, and the indicator device will be smooth and annular. But when a seismic event occurs, the force moves from the nut inward to the swaged fitting. When the engineer inspects, and finds that the indicator has "crowned" i.e., assumed the FIG. 4 position and condition, he/she will know that the cable has received a predetermined amount of force. For the 3/4 inch cables discussed herein that amount is set at 38,000 pounds.

What happens is that the cables are meant to yield when they receive a certain amount of force, i.e., elongate. By doing so, the cables absorb the energy and elongate, and they don't snap and the bridge doesn't fall.

Since the cables have no memory, i.e., they don't return to their previous length prior to the stressing, they are replaced on an individual basis. The engineer inspects, sees the crown formation (FIG. 4) and tells the maintenance crew to replace this cable, but to leave that one alone as no "crowning" was observed.

At the time of the Northridge earthquake, there was no NDT—nondestructive test to see if the cables had been stressed their finite amount. Thus the need for this invention is clearly demonstrated. Those that had already been stressed, when hit by the earthquake's huge forces, snapped. It is the longitudinal movement, along the length of the bridge that can cause the bridge to fall and about which force the device of this invention is intended to warn.

It is seen that I have devised a simple, inexpensive device that is currently being utilized on such bridge areas as the reconstructed Cypress (Street) Freeway in Oakland, that crashed during the Loma Prieta earthquake in the San Francisco area, among others. This device can be made easily and quickly installed to advise of cable problems before "the big one".

It is to be seen that the cable yield indicators of this invention can be used with any of the three types of earthquake restrainer cable configurations in general use. Since the safety of a bridge could be a life or death situation, the cable yield indicators must be manufactured to have a yield strength that is just below the yield strength of the wire cables with which they are to be associated. Thus cables with a yield strength of 39,500 pounds will have cable yield indicators that have a yield strength of 37,000 pounds, plus or minus 1000 pounds.

It is seen therefore that the steel manufacturing process for the devices of this invention requires a full measure of care to be exercised such that the devices can be consistently manufactured with high tolerances. It is within the skill of the art to choose an annealed steel of high strength consistency to achieve these goals.

Since certain changes may be made in the above described device without departing from the scope of the invention herein involved, it is intended that all matter contained in the above description and in the accompanying drawings, if present, shall be interpreted as illustrative only and not in a limiting sense.

I claim:

1. An elongated annular device, fixedly mountable upon a bridge cable and adapted to yield a visible indication of the receipt of excess force upon the cable, whereby the device changes shape when the cable receives an amount of force equal to or greater than the amount of force needed to stress the cable.

2. An elongated annular device to provide a visible indication of the excessive elongation of a bridge cable due to longitudinal stresses when mounted thereon, which device comprises an annular member having an outside wall and an inside wall, said inside wall having a central zone of reduced cross section, said central zone being adapted to form an outwardly crowned area upon the receipt of a predefined amount of force.

3. An elongated annular device to provide a visible indication of the excessive elongation of a bridge cable due to longitudinal stresses when mounted thereon, which device comprises an annular member having an outside surface and an inside surface, the wall of which device has two full thickness mirror image zones, each of which commences at an opposite extreme edge and each full thickness zone is interiorly connected to one end of an inwardly directed angular zone, respectively, and the respective inwardly directed zones each terminate at opposite ends of a central reduced uniform thickness zone.

4. A bridge cable mounting system which includes a tubular cable yield indicator device which comprises:
   a. a cable connected to and passing through a first swaged fitting, said swaged fitting having a stud at the end opposite said cable, said stud passing through a mounting plate, and having mounted thereon, on the opposite side of the mounting plate from the first swaged fitting,
   b. a tubular cable yield indicator which is adapted to deform when the cable has been excessively stressed.

5. In the cable mounting system of claim 4 further including:
   c. at least one spherical washer disposed upon the stud, and
   d. a pair of opposed disk washers of predetermined value disposed on said stud and retained by a nut.

6. In the cable mounting system of claim 4 wherein the cable yield indicator is an annular member which forms a crown thereon when the cable is excessively stressed.

\* \* \* \* \*